March 21, 1961  M. E. C. FREEMAN ET AL  2,975,813
FRUIT PROCESSING MACHINE
Filed Aug. 4, 1955  4 Sheets-Sheet 1
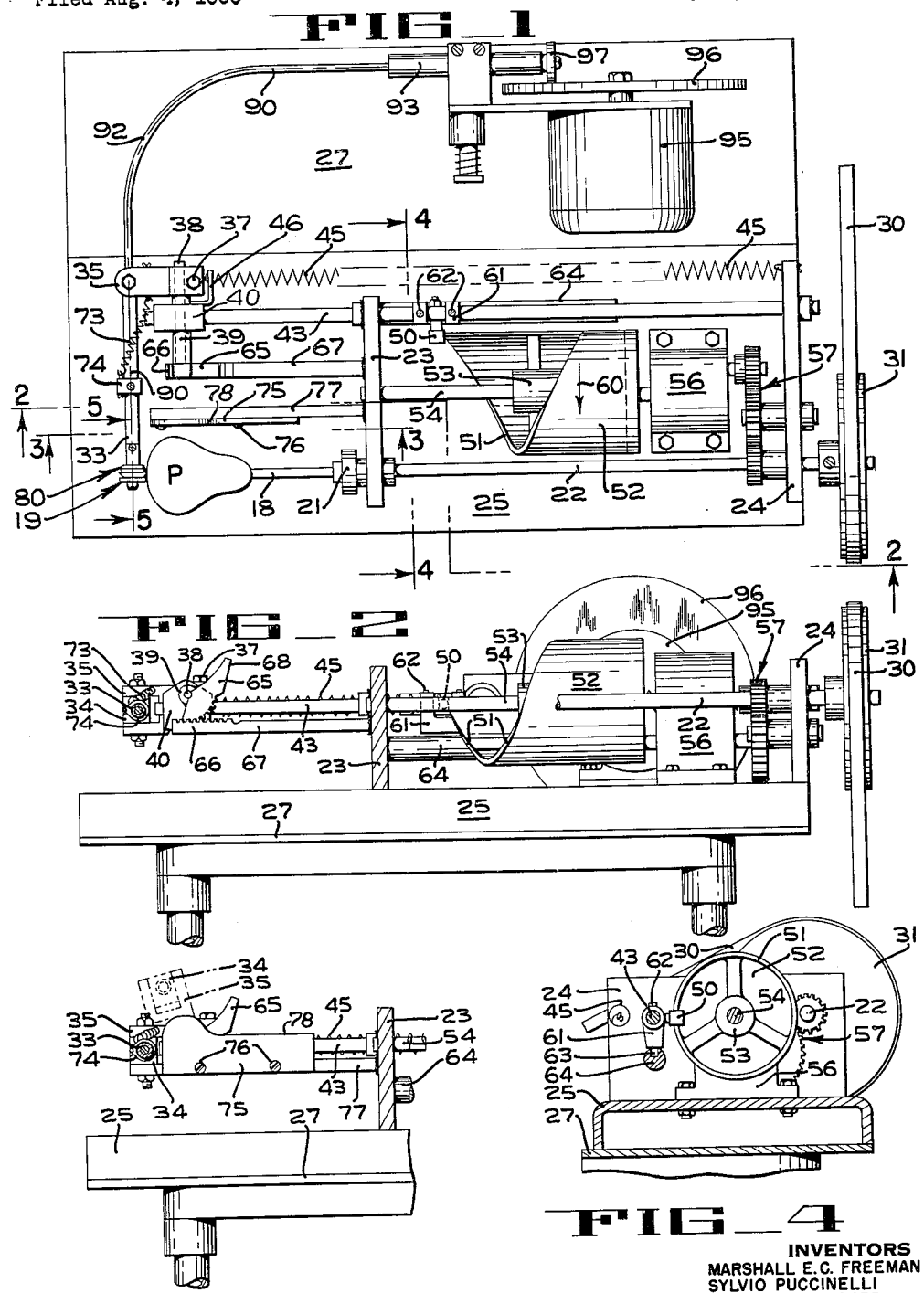
INVENTORS
MARSHALL E.C. FREEMAN
SYLVIO PUCCINELLI
SHERMAN H. CREED
BY Hans G. Hoffmeister
ATTORNEY

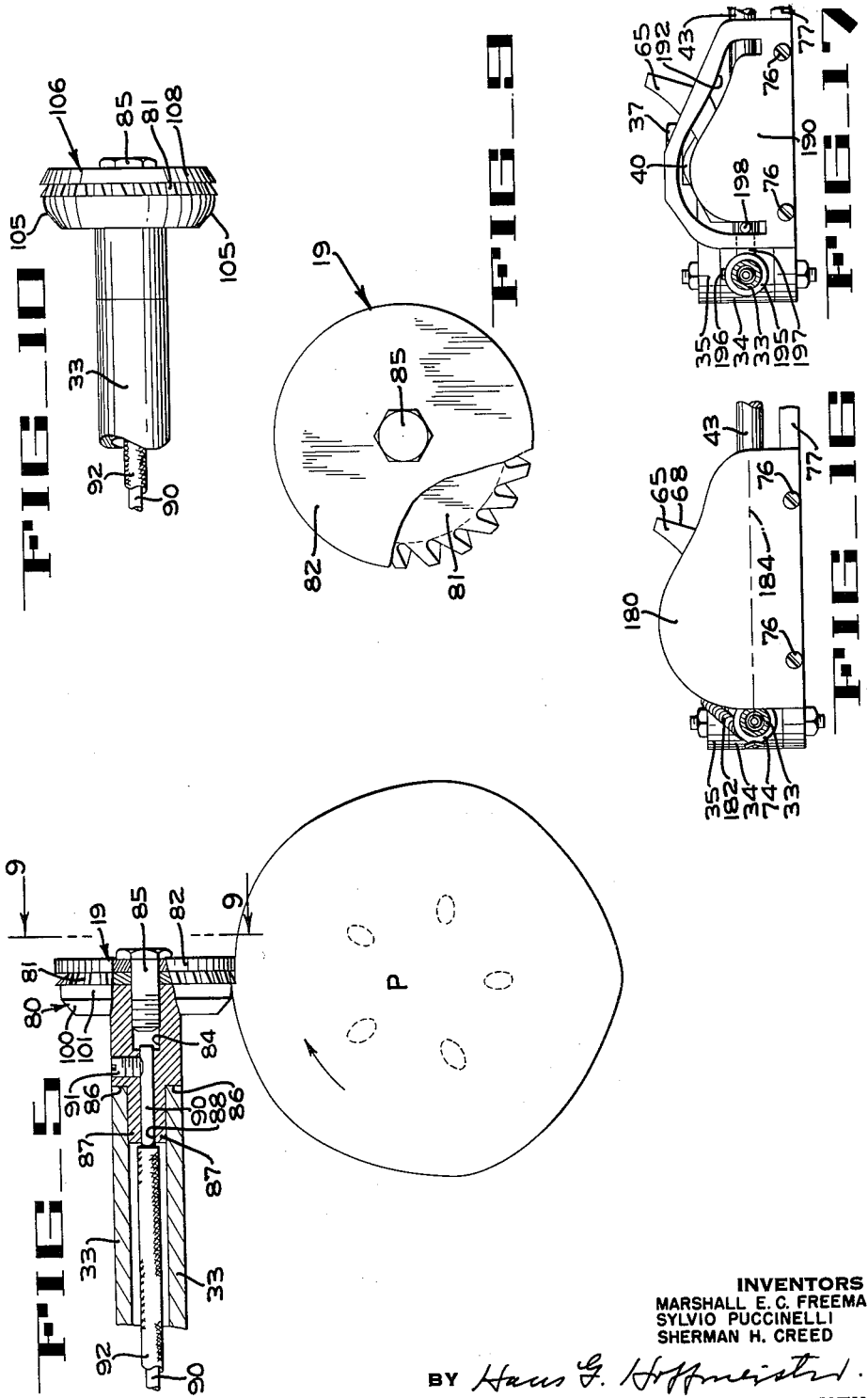

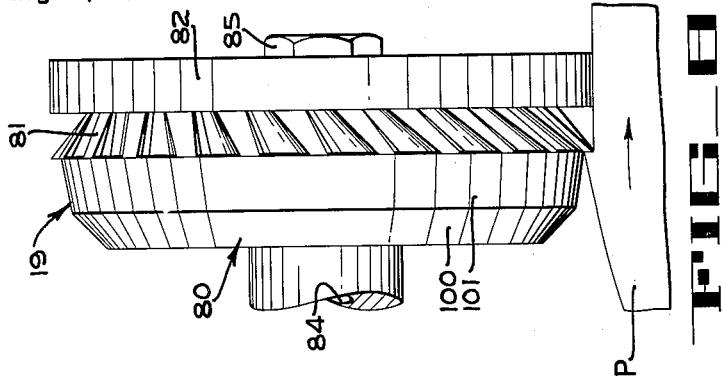
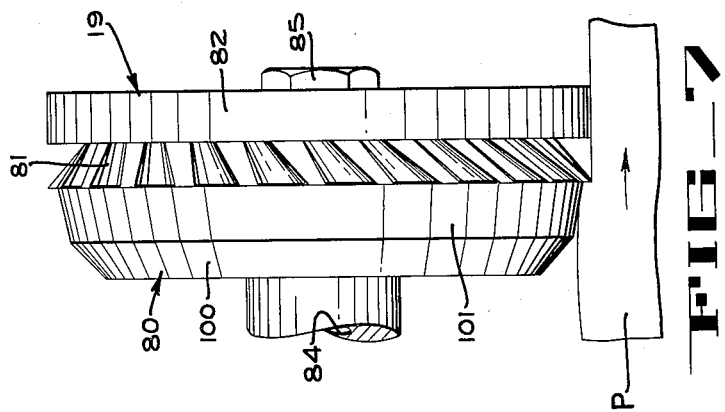
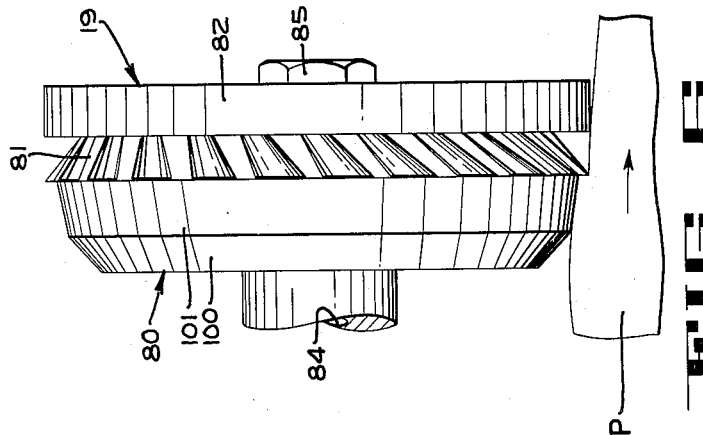

March 21, 1961  M. E. C. FREEMAN ET AL  2,975,813
FRUIT PROCESSING MACHINE
Filed Aug. 4, 1955  4 Sheets-Sheet 4
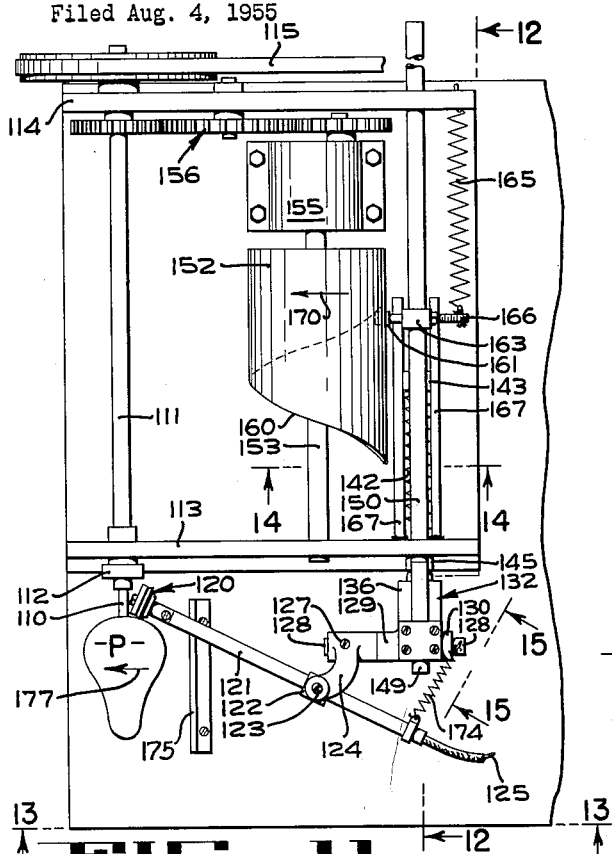
FIG_11
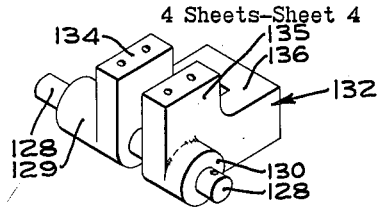
FIG_15
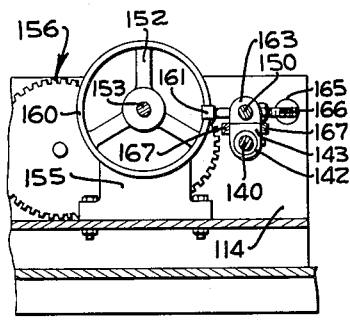
FIG_14
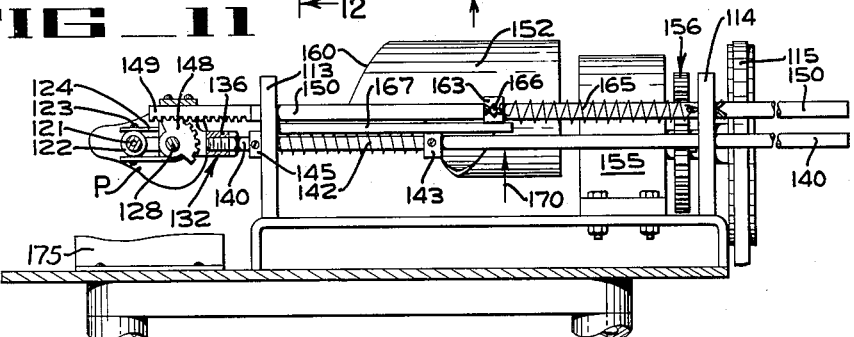
FIG_12
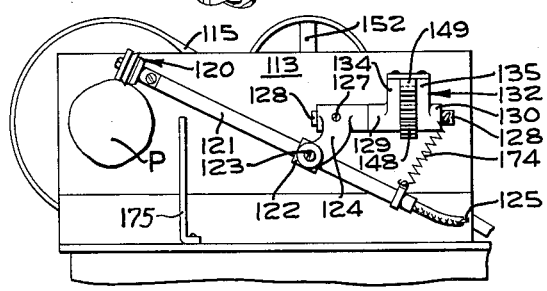
FIG_13
INVENTORS
MARSHALL E.C. FREEMAN
SYLVIO PUCCINELLI
SHERMAN H. CREED
BY Hans G. Hoffmeister
ATTORNEY United States Patent Office 2,975,813
Patented Mar. 21, 1961

2,975,813

FRUIT PROCESSING MACHINE

Marshall E. C. Freeman and Sylvio Puccinelli, San Jose, and Sherman H. Creed, Campbell, Calif., assignors to Food Machinery and Chemical Corporation, San Jose, Calif., a corporation of Delaware Filed Aug. 4, 1955, Ser. No. 526,438

16 Claims. (Cl. 146—43)

This invention pertains to machinery for processing fruit, and more particularly relates to an improved apparatus for peeling fruit, such as pears or the like.

Fruit peeling machines in which rotating cutters are used have not been entirely satisfactory due, in a large measure, to the fact that it is difficult to control the depth of cut of rapidly rotating cutters as they move over the curved surface of a pear. Unless the cutters are under the positive control of adequate gauges at all times, the rapidly rotating cutters have a tendency to dig into the surface and remove excessive quantities of the meat of the fruit.

An object of the present invention is to provide a fruit peeling machine of the rotary cutter type which will efficiently remove peel from the fruit.

Another object is to provide an efficient mechanism for controlling the movement of a rotating cutter over the surface of a pear as the cutter contacts and removes the skin from the pear.

Another object of the present invention is to provide an improved mechanism for contour peeling pears or the like.

Other and further objects and advantages of the present invention will become apparent from the following description taken in connection with the accompanying drawings, in which:

Fig. 1 is a plan of the pear peeling machine of the present invention.

Fig. 2 is a fragmentary vertical section taken along line 2—2 of Fig. 1.

Fig. 3 is a fragmentary vertical section taken along line 3—3 of Fig. 1.

Fig. 4 is a fragmentary vertical section taken along line 4—4 of Fig. 1.

Fig. 5 is an enlarged fragmentary end elevation, with parts broken away and parts in section, of a portion of the machine of Fig. 1, taken in the direction of arrows 5—5 of Fig. 1, and particularly showing the cutter assembly after it has moved up over the butt end of a pear.

Figs. 6, 7 and 8 are enlarged views of the cutter assembly of Fig. 5, each view showing a different operating position of the cutter.

Fig. 9 is an enlarged end view, partly broken away, of the cutter assembly of Fig. 5, taken in the direction of arrows 9—9 of Fig. 5.

Fig. 10 is a view similar to Fig. 5 but showing a modified cutter assembly.

Fig. 11 is a fragmentary plan of a modified form of the pear peeling machine of the present invention.

Fig. 12 is a fragmentary vertical section taken along line 12—12 of Fig. 11.

Fig. 13 is a fragmentary end elevation of the machine of Fig. 11, taken in the direction of arrows 13—13 of Fig. 11.

Fig. 14 is a fragmentary vertical section taken along line 14—14 of Fig. 11.

Fig. 15 is an enlarged isometric view of one of the elements of the peeling machine shown removed from the machine, the view being taken in the direction indicated by arrows 15—15 of Fig. 11.

Fig. 16 is a vertical section taken along line 3—3 of Fig. 1, particularly showing a modified guide plate which is used to adapt the machine of Fig. 1 for the contour peeling of pears.

Fig. 17 is a vertical section, similar to Fig. 16, showing a second modified guide plate which is also used in the contour peeling of pears.

In the pear peeling machine of the present invention, a pear P (Fig. 1) is impaled along its stem-blossom axis on a continuously rotating rod or stemming tube 18. A cutter assembly 19, which has a rapidly rotating cutting blade, is moved over the surface of the rotating pear in a direction lengthwise of the pear from the butt end to the stem end, following a generally spiral-shaped path as it removes peel from the surface.

The pear support tube 18 (Figs. 1 and 2) is secured by a coupling 21 to a shaft 22 which is journalled for rotation in two walls 23 and 24 projecting upwardly from a platform 25 that acts as a stationary support means for the peeling mechanism and is mounted in spaced relation above a table top 27 (Figs. 1 and 4). The shaft 22 is driven by a motor (not shown) through a belt 30 trained around a pulley 31 keyed to one end of the shaft.

The cutter assembly 19, to be described in detail hereinafter, is mounted on the end of a support tube or member 33 (Fig. 1) which has a hub 34 (Fig. 3) pivotably mounted between the arms of a yoke 35. The yoke 35 is clamped by means of a bolt 37 to a shaft 38 which is rotatably journalled in a bearing sleeve 39 that is pressed in a support block 40 (Figs. 1 and 2). The support block 40 is secured in fixed position on the end of a rod 43 which is slidably journalled in the walls 23 and 24 and acts as a carrier for the support block 40 and the tube 33. A spring 45 (Fig. 1) is anchored at one end in the wall 24 and at the other end in a lateral extension 46 of the block 40 and tends to draw the block 40 and the shaft 38 toward the wall 23. Movement of the block 40 toward the wall 23 is prevented by a cam roller follower 50 which is secured to the rod 43 and bears against the camming surface 51 of a barrel cam 52. The cam 52 has a central hub 53 keyed to a shaft 54 that is journalled in the wall 23 and disposed in driven engagement in a speed reducer 56 that is connected through a train of gears 57 with the drive shaft 22. It will be evident that, when the barrel cam 52 is rotated in the direction of arrow 60 (Fig. 1), the camming surface will progressively move away from the cam follower 50, permitting the spring 45 to draw the block 40 and the shaft 38 toward the wall 23, whereby to cause the cutter assembly 19 to move lengthwise along the pear from the butt end to the stem end. Rotation of rod 43 is prevented by a guide member 61 (Figs. 2 and 4) which is secured by setscrews 62 to the rod and has a tongue 63 disposed in guided relation in a groove in a stationary rod 64 that is mounted in parallel relation below the rod 43.

During the initial part of the movement of the block 40 toward the right from the position of Fig. 1, the yoke 35 is moved from the substantially horizontal, full-line position of Fig. 3 to the dotted line position. This pivoting of the yoke carries the cutter 19 from the position of Fig. 1, adjacent the center of the butt end of the pear, to the position of Fig. 5 in which the cutter is on the upper side of the pear. Pivoting movement of the yoke 35 is accomplished during the initial movement of the block 40 by the engagement of a gear segment 65 (Fig. 2), which is welded to the shaft 38, with a rack 66 formed on a rigid rod 67 of square cross-section that is secured to and projects away from the wall 23. When the yoke 35 reaches the desired substantially vertical position, pivoting movement of the gear segment 65 is arrested by the disengaging of the teeth of the rack and gear, and by the abutment of a flat surface 68 of the gear segment with the flat upper surface of the square rod 67. As the block 40 continues its movement toward the wall 23 under the urging of the spring 45, the gear segment 65 moves along the rod 67 with the surface 68 sliding along the flat top of the rod.

The cutter assembly is continuously urged into contact with the surface of the pear by a spring 73 (Fig. 1) that is connected between the yoke 35 and a collar 74 adjustably secured to the support tube 33. An upstanding guide plate 75 (Figs. 1 and 3), which is secured by capscrews 76 to a rigid rod 77, projects away from the wall 23, generally parallel to the rod 67. The plate 75 has an outer peripheral edge 78 that limits the inward swinging movement of the support tube 33 so that the cutter assembly 19 will not collide with the fins of the support tube 18 when there is no pear impaled on the tube. It will be understood that the guide plate 75 is so designed and located that it will prevent the cutter from pivoting downwardly to contact the support tube 18, but will permit the cutter to swing inwardly far enough to peel the stem end of the pear. Suitable clutches and switches (not shown) are provided to disconnect the operating mechanisms from the drive means at the end of a peeling cycle.

The cutter assembly 19 (Fig. 5) comprises a front gauge ring 80, a circular cutting blade 81, and a generally cylindrical back gauge ring 82. It will be noted that as the pear P is rotated in a clockwise direction (Fig. 5) the periphery of the pear moves transversely across the cutter assembly from left to right. The left side of each gauge and of the cutting blade, which is the side first contacted by the pear, will be hereinafter referred to as the leading side while the right side of each gauge and of the blade will be called the trailing side. The front gauge 80 has a central bore 84 that is tapped at one end to receive a bolt 85 which holds the cutter 81 and the back gauge 82 in fixed position relative to the front gauge. The forward portion of the front gauge has a shoulder 86 abutting the end of the support tube 33 and a reduced diameter portion 87 rotatably journalled in the support tube. The forward portion of the gauge is also provided with a central opening 88 in which the end of a flexible drive shaft 90 is locked by a setscrew 91. The flexible drive shaft 90 which is shown as a dot-dash line in Fig. 1, extends away from the cutter assembly through the support tube 33 and through a flexible tubular sheathing 92 and is supported in a fixed support 93. The drive shaft 90 is driven from an electric motor 95 through the frictional engagement of a circular drive plate 96, which is keyed to the motor shaft, with a driven wheel 97 keyed to the flexible drive shaft 90.

In Fig. 5 it will be noted that, at the butt end of a pear, there are five high spots which are disposed radially outwardly from the seed cells (shown in dotted lines). Since the pear P is rotated in a clockwise direction (Fig. 5), it is evident that the rapidly rotating cutter assembly 19 will rise and fall as the irregular curved surface of the pear passes therebeneath. During the peeling operation, the cutter will consecutively contact a downwardly sloped surface as in Fig. 6, a substantially level surface as in Fig. 7, and an upwardly inclined surface as in Fig. 8. If the depth of cut is not controlled at all times, the cutter will periodically dig into the surface of the pear and leave lengthwise furrows or grooves which will remain in the surface of the pear when the peeling operation is finished. It will be appreciated that Figs. 6, 7 and 8 illustrate only typical conditions and are not intended to provide an exhaustive study of all conditions of a pear surface or all operating positions of a cutter relative to a fruit surface.

In accordance with the present invention, front and back gauge rings 80 and 82, respectively, are provided on the cutter assembly to control the depth of cut, and these gauges are so designed that the cutter 81 will not dig into the surface of the pear under any normal condition of the pear surface.

In the cutter illustrated in Fig. 6, it will be seen that the front gauge 80 has a forward, steeply inclined portion 100, and a rearward frusto-conical portion 101 that is less steeply inclined. When the surface to be peeled is inclined downwardly as in Fig. 6, the front gauge 80 takes over the gauging function. It has been found that the performance of the cutter is improved by relieving the entrance edge of the front gauge, as by providing the conical portion 101, or by providing a radius at the entrance edge, as shown at 105 (Fig. 10), on a modified cutter assembly 106.

The back gauge may have a cylindrical surface as in gauge 82 of Fig. 5 or the surface may be frusto-conical as in the gauge 108 of Fig. 10. When the surface to be peeled is inclined upwardly, as in Fig. 8, the back gauge takes over the gauging function. It has been found that superior peeling is obtained when the back gauge is larger in diameter than the front gauge. It may be of substantially the same diameter as the cutter 81 or as small as the diameter of the front gauge 80 plus 50 percent of the difference between the diameter of the knife and the diameter of the front gauge.

When a level surface is to be peeled, as in Fig. 7, the thrust on the pear, resulting from the weight of the cutter, the cutter arm and the pull of the spring 73, is divided between the front and back gauges.

The cutter 81 (Fig. 9) is a typical circular cutting blade having a saw-tooth peripheral cutting edge. It has been found that this type of cutter gives satisfactory results when gauged as described above. A suitable cutter may be from 1¼ to 1½ inches in diameter and should be rotated at approximately 8000 r.p.m., although the size and speed of rotation may be varied.

In Figs. 11 through 15 a modified arrangement of the pear peeling machine of the present invention is illustrated. This arrangement is particularly adapted to peel a pear P that is impaled on a support tube 110, butt end first instead of stem end first, as in Fig. 1. As seen in Fig. 11, the support tube 110 is secured to a drive shaft 111 by means of a coupling 112. The shaft 111 is journalled in upstanding support walls 113 and 114 of a stationary support platform and is driven from a motor (not shown) through a belt and pulley drive 115.

A cutter assembly 120 is mounted on the end of a support tube or member 121 which has a hub 122 pivotally mounted by a pin 123 in a cutter support member which is in the form of a yoke 124. The cutter assembly 120 may be identical to the cutter assembly 19 of Fig. 5 and may be driven from a flexible drive shaft 125 substantially in the same manner as the cutter assembly 19 is driven. The yoke 124 is keyed by a setscrew 127 to a shaft 128 that is rotatably journalled by a pair of aligned bearing sleeves 129 and 130 (Fig. 15) integrally formed on a support block 132. The support block 132 has two upstanding wall portions 134 and 135 and a hub 136 into which an actuating rod 140 (Fig. 12) is threaded. The rod 140, which is slidably journalled in the support walls 113 and 114 and acts as a carrier for the tube 121, is urged toward the right by a spring 142 disposed between the wall 113 and a collar 143 secured to the rod 140. A second collar 145 limits the movement of the rod 140 toward the right.

At the beginning of the peeling operation, the cutter assembly 120 is swung from the position shown in Fig. 11 to the elevated position of Fig. 13 by means of a gear segment 148 (Fig. 12) which is keyed to the shaft 128 and is in mesh with a rack 149. The rack 149 is mounted, for guided movement between the wall portions 134 and 135 of the block 132, on the end of a rod 150 which is slidably journalled in the support walls 113 and 114. Movement of the rod 150 is controlled by a barrel cam 152 which is keyed to a longitudinal, rotatable shaft 153 (Fig. 11). The shaft 153 is driven, through a speed reducer 155 and a gear train 156, from the drive shaft 111. A camming surface 160 of the barrel cam abuts a cam roller follower 161 that is secured to a block 163 carried by the sliding rod 150. A spring 165, connected between the support wall 114 and a stud 166 (Fig. 11) projecting from the block 163, normally pulls the block 163 and the rod 150 toward the wall 114 to hold the roller follower 161 against the camming surface 160. Rotation of the rods 150 and 140 is prevented by two stationary guide bars 167 (Fig. 14) that are disposed in guiding relation on opposite sides of the block 163 on rod 150 and on opposite sides of the collar 143 on rod 140.

When the barrel cam is rotated in the direction of arrow 170 (Fig. 12), the follower 161 and the rod 150 are moved toward the left, causing the rack 149 to rotate the gear segment 148 counterclockwise to swing the yoke 124 downwardly to the position of Fig. 13 and to raise cutter assembly 120 up over the butt end of the pear. When the yoke 124 is directly below the shaft 128, and the support tube 121 is in a vertical plane through the axis of the shaft 128, the block 163 contacts the collar 143 (Fig. 12) on the actuating rod 140 to push the rod 140 and the support block 132 toward the left, whereby to move the cutter assembly 120 toward the stem end of the pear. A spring 174 (Fig. 13), connected between the shaft 128 and the cutter support tube 121, maintains a pressure on the tube 121 tending to hold the cutter assembly 120 in contact with the surface of the pear. An upstanding guide plate 175 (Figs. 11 and 13) prevents the cutter 120 from contacting the stemming tube when there is no pear thereon.

To put the machine of Fig. 11 into operation, a pear is impaled on the tube 110 and the rotary cutter 120 is positioned adjacent the center of the butt end of the pear. The barrel cam 152 and the cam follower 161 are then moved to the position shown in Fig. 11. When power is applied, the pear support tube 110 is rotated in the direction of arrow 177 and the barrel cam is rotated in the direction of arrow 170. During the first portion of the rotation of the barrel cam, the sliding rod 150 and the rack 149 are moved toward the left (Fig. 12) to rotate the gear segment 148 in a counterclockwise direction, moving the yoke 124 downwardly and the rotating cutter 120 (Fig. 13) upwardly over the butt end of the pear. Just as the cutter reaches the elevated position of Fig. 13 the block 163 (Fig. 12) on the rod 150 contacts the collar 143 on the rod 140, causing the movement of the rods 140 and 150 as a unit toward the wall 113 to carry the rotating knife along the length of the pear. The spring 174 exerts a pull on the support tube 121 to maintain the cutter in contact with the pear surface. It will be noted in Fig. 13 that, since the support tube 121 is pivoted about pin 123, the cutter will move in toward the axis of the pear as it approaches the stem end of the pear. Since the inward arc of travel of the cutter passes close to the axis of the pear, at every position the cutting edge of the cutter will be substantially on a radius through the pear axis. Accordingly, at every position, the angle between the plane of the cutter and a tangent to the surface of a theoretically round pear through the point of contact is substantially constant.

The machines disclosed in Figs. 1 and 11 are arranged to efficiently peel skin from a pear on the like, leaving a peeled pear that has a contour substantially the same as the contour of the original unpeeled pear surface. However, a portion of the pears that are canned are processed so that the peeled surface of the pear has the predetermined contour which the consuming public associates with a deluxe or premium product. The machine of Fig. 1 may be arranged to contour peel pears by removing the guide plate 75 (Fig. 1) from the rod 77 and replacing it with the guide plate 180 of Fig. 16, and replacing the relatively light spring 73 (Fig. 1) with a stronger spring 182. The plate 180 has a contour, above the reference line 184, which corresponds to the desired, optimum contour. In operation, the spring 182 yieldingly urges the cutter support tube 33 against the contoured surface of the guide plate 180 so that, as the rotary cutter assembly, on the outer end of the tube 33, traverses the length of the pear, it will cut away the unpeeled surface of the pear to a depth dictated by the contour of the guide plate 180. It will be understood that the spring 182 must be strong enough to maintain the tube 33 in contact with the surface of the guide plate 180 at all times.

In Fig. 17 a second arrangement, for contour peeling a pear, is illustrated. A guide plate 190, having a contoured camming groove 192, is adapted to be secured on the rod 77 of Fig. 1 by setscrews 76. The collar 74, on the cutter support tube 33 of Fig. 1, is replaced by a collar 195 which may be rigidly secured to the tube 33 by a setscrew 196. The collar 195 has an integrally formed arm 197 which projects radially from the collar and carries a rotatable roller follower 198 at its outer end. The roller 198 rides in the groove 192 whereby, as the rotary cutter on the end of the tube 33 traverses the length of the pear, the tube 33 and the cutter follow a path controlled by the configuration of the camming groove 192 to obtain a peeled pear having a desired contour.

It will be recognized that, when either the arrangement of Fig. 16 or that of Fig. 17 is used to contour peel pears, neither a front gauge nor a back gauge is necessary on the rotary cutter head.

From the foregoing description it will be recognized that the present invention provides a machine particularly adapted for efficiently peeling pears or the like. The use of front and rear depth gauges of predetermined size and configuration assures continuous and adequate support for the cutting blade at all times. Further, the present cutter head mounting, which permits the spring-urged pivoting of the cutter head about an axis parallel to the axis of rotation of the pear, makes possible the automatic, self-adjusting movement of the cutter head to accommodate surfaces of different inclinations, and also makes possible a simple, efficient method of contour peeling a pear.

Having thus described my invention, what I claim as new and desire to protect by Letters Patent is:

1. A pear peeling machine comprising a platform, a spindle on said platform adapted to support a pear with the stem-blossom axis of the pear having a fixed orientation relative to said platform, a rod slidably journalled on said platform for movement along a fixed straight line path longitudinally of said spindle, means for moving said rod along said fixed path, a cutter support pivotally supported from said rod and connected to said rod for bodily movement therewith, a rotary cutter mounted on said cutter support in position to move along the length of a pear on said spindle as said rod moves along said longitudinal path, and means connected between said cutter support and said platform for pivoting said cutter support to swing said cutter through a fixed angular distance as said cutter traverses the butt end of the pear.

2. A pear peeling machine comprising a rotatable spindle arranged to impale a pear along its stem-blossom axis, a pivot shaft disposed transverse to said spindle axis and in a vertical plane passing through substantially the largest cross-sectional area of the butt end of a pear impaled on said spindle, a yoke pivotally mounted on said shaft, a cutter support arm disposed in a substantially horizontal plane passing through said shaft, said arm being pivotally connected to said yoke at a point on one side of said vertical plane and having an end portion disposed on the opposite side of said vertical plane and adjacent said spindle, a rotary cutter mounted on said end portion in contact with the butt end of the pear, and means for rotating said shaft in a direction to swing downwardly the point of pivotal connection of said arm to said yoke and to swing said cutter upwardly over the butt end of the pear toward said transverse vertical plane.

3. A pear peeling machine comprising a rotatable spindle arranged to impale a pear along its stem-blossom axis, a pivot shaft disposed transverse to said spindle axis and in a vertical plane passing through substantially the largest cross-sectional area of the butt end of a pear impaled on said spindle, a yoke pivotally mounted on said shaft, a cutter support arm disposed in a substantially horizontal plane passing through said shaft, said arm being pivotally connected to said yoke at a point on one side of said vertical plane and having an end portion disposed on the opposite side of said vertical plane and adjacent said spindle, a rotary cutter mounted on said end portion in contact with the butt end of the pear, means mounting said yoke for movement longitudinally of said spindle axis to move said cutter longitudinally over the pear, and means for successively rotating said shaft and then moving said yoke in said longitudinal direction.

4. A pear peeling machine comprising a rotatable spindle arranged to impale a pear along its stem-blossom axis, a pivot shaft disposed transverse to said spindle axis and in a transverse plane passing through substantially the largest cross-sectional area of the butt end of a pear impaled on said spindle, a yoke pivotally mounted on said shaft, a cutter support arm disposed substantially in a plane passing through said spindle, said arm being pivotally connected to said yoke at a point on one side of said transverse plane and having an end portion disposed on the opposite side of said transverse plane and adjacent said spindle, a rotary cutter mounted on said end portion in contact with the butt end of the pear, and means for rotating said shaft in a direction to swing said cutter and the point of pivotal connection of said arm to said yoke in opposite directions away from the plane of said spindle whereby said cutter is moved over the butt end of the pear toward said transverse plane.

5. A pear peeling machine comprising a rotatable spindle arranged to impale a pear along its stem-blossom axis, a pivot shaft disposed transverse to said spindle axis and in a transverse plane passing through substantially the largest cross-sectional area of the butt end of a pear impaled on said spindle, a yoke pivotally mounted on said shaft, a cutter support arm disposed substantially in a plane passing through said spindle, said arm being pivotally connected to said yoke at a point on one side of said transverse plane and having an end portion disposed on the opposite side of said transverse plane and adjacent said spindle, a rotary cutter mounted on said end portion in contact with the butt end of the pear, means mounting said yoke for movement longitudinally of said spindle axis to move said cutter longitudinally over the pear, and means for successively rotating said shaft and then moving said yoke in said longitudinal direction.

6. A pear peeling machine comprising stationary support means, a spindle mounted for rotation on said support means and adapted to impale a pear along its stem-blossom axis, a cutter support tube adjacent said spindle, a rotary cutter mounted for rotation adjacent the end of said tube, drive means extending through said tube and connected in driving engagement to said cutter, means providing a pair of gauge surfaces disposed adjacent the end of said tube, one on the leading side of said cutter and the other on the trailing side of said cutter, means mounting said cutter support tube for pivoting movement about an axis generally parallel to the axis of said spindle to position said cutter in contact with the surface of a pear on said spindle, means mounting said cutter support tube for bodily movement along a path generally parallel to the axis of said spindle to carry the cutter longitudinally along the surface of the pear, and means for rotating said spindle to advance the surface of the pear in a rotary path transverse to the path of movement of the peripheral cutting edge of said cutter, the gauge surface on the leading side of said cutter being disposed closer to the axis of rotation of said cutter than is the effective cutting edge of said cutter to determine the depth of cut, and the gauge surface on the trailing side of said cutter being disposed farther from said axis of rotation than the leading gauging surface and adapted to ride in supporting relation on the unpeeled surface of the fruit, the pivot axis of said cutter support tube being disposed a predetermined distance from said spindle, said distance being coordinated with the length of said tube so that the angle between the plane of said cutter and a tangent to the surface of the rotating pear through the point of contact of the cutter with the pear will remain constant during a major portion of the movement of the cutter along the pear.

7. A pear peeling machine comprising a platform, a spindle on said platform adapted to support a pear with the stem-blossom axis of the pear having a fixed orientation relative to said platform, a rod slidably journalled on said platform for movement along a fixed straight line path longitudinally of said spindle, a block mounted on said rod, a cutter support arm pivotally mounted on said block and having a portion movable from a position adjacent the center of the butt end of the pear to a position adjacent the side of the butt end as said arm is pivoted, a rotary cutter mounted on said cutter support portion in position to move along the length of a pear on said spindle as said rod moves along said longitudinal path, means connected between said platform and said block and responsive to movement of said block for pivoting said cutter support arm to swing said cutter through a fixed angular distance from the center of the butt end to said position adjacent the side of the butt end as said cutter traverses the butt end of the pear, means for moving said rod along said fixed path to carry said support arm and said cutter along the length of the pear on the spindle, and means for urging said cutter into contact with the surface of the pear during said swinging movement and said longitudinal movement of said cutter.

8. A pear peeling machine comprising a platform, a spindle on said platform adapted to support a pear in a substantially horizontal position and with its upper surface exposed and with the stem-blossom axis having a fixed orientation relative to said platform, a rod slidably journalled on said platform for movement along a fixed straight line path longitudinally of said spindle, a block carried by said rod, a shaft rotatably journalled in said block, a cutter support pivotally supported from said rod and connected to said rod for bodily movement therewith and having an end portion movable in a curved path from a position adjacent the center of the butt end of the pear to a position adjacent the side face of the butt end as said shaft is rotated through a fixed angle, a rotary cutter mounted on said cutter support in position to move along the length of a pear on said spindle as said rod moves along said longitudinal path, means biasing said cutter into contact with the surface of the pear as said end portion moves along said curved path, means for rotating said cutter, a rack mounted on said platform, a gear in mesh with said rack and keyed to said shaft and arranged upon actuation to rotate said shaft through said fixed angle for pivoting said cutter support to swing said cutter through a fixed angular distance as said cutter traverses the butt end of the pear, and power driven control means connected to said rod for moving said rod along said fixed path to simultaneously actuate said gear and move said shaft bodily with said rod, and then continue the sliding movement of said rod to carry said cutter along the entire length of the pear.

9. A pear peeling machine comprising a platform, a spindle on said platform adapted to support a pear with the stem-blossom axis of the pear having a fixed orientation relative to the platform, a rod slidably journalled on said platform for movement along a fixed straight line path longitudinally of said spindle, a block carried by said rod for movement therewith, a shaft rotatably journalled in said block, a yoke keyed to said shaft, a cutter support pivotally mounted on said yoke and having a portion movable in a curved path from a position adjacent the center of the butt end of the pear to a position adjacent the side face of the butt end as said shaft is rotated through a fixed angle, a rotary cutter mounted on said movable portion of said cutter support to move along the length of a pear on said spindle as said rod moves along said longitudinal path, means for rotating said cutter, means urging said cutter into contact with the pear as said cutter moves along said curved path, a rack mounted in fixed position on said platform, a segmental gear keyed to said shaft and in mesh with said rack and arranged upon actuation to rotate said shaft through said fixed angle, power driven control means conected to said rod for moving said rod along said fixed path to move said block a predetermined distance, said gear and said rack being movable in meshing engagement during a first portion of the movement of said block whereby to actuate said segmental gear for pivoting said cutter support to swing said cutter through a fixed angular distance as said cutter traverses the butt end of the pear, and means defining cooperating surfaces on said rack and on said segmental gear movable into sliding engagement during a second portion of the movement of said block.

10. A pear peeling machine comprising a platform, a spindle on said platform adapted to support a pear with the stem-blossom axis of the pear having a fixed orientation relative to said platform, a rod slidably journalled on said platform for movement along a fixed straight line path longitudinally of said spindle, means for moving said rod along said fixed path, a cutter support pivoted on said rod and connected to said rod for bodily movement therewith, a rotary peeling cutter mounted on said cutter support for movement toward and away from the axis of said spindle and for movement along the length of the pear on said spindle in peeling contact with the surface of the pear as said rod moves along said longitudinal path, cam means operatively connected between said cutter support and said platform for pivoting said cutter support to swing said cutter through a fixed angular distance as said cutter traverses the butt end of the pear and for controlling the movement of said cutter toward and away from the axis of rotation of the spindle as said cutter traverses the length of the pear, means for rotating said cutter, and means for rotating said spindle as said cutter is moved longitudinally of the pear.

11. A pear peeling machine comprising a platform, a rotatable spindle on said platform adapted to support a pear with the stem-blossom axis of the pear having a fixed orientation relative to said platform, a rod mounted on said platform for sliding movement along a fixed straight line path in a direction longitudinally of said spindle, a cutter support pivotally supported on said rod and connected to said rod for bodily movement therewith, a rotatable cutter mounted on said cutter support in position to move along the length of a pear on said spindle as said rod moves along said longitudinal path, means for rotating said cutter, means mounting said cutter for movement longitudinally of said spindle and for movement toward or away from said spindle, means operatively connected to said mounting means for moving said cutter longitudinally of the pear, means for moving said rod along said fixed path, means connected between said platform and said mounting means for pivoting said cutter support to swing said cutter through a fixed angular distance as said cutter traverses the butt end of the pear and for guiding said cutter along a predetermined path relative to said spindle during said longitudinal movement, and means for rotating said spindle as said rotating cutter traverses the length of the pear.

12. A pear peeling machine comprising a platform, a rotatable spindle on said platform adapted to support a pear for rotation about the stem-blossom axis of the pear with said axis having a fixed orientation relative to said platform, a rod slidably journalled on said platform for movement along a fixed straight line path in a direction longitudinally of said spindle, a cutter support pivotally supported from said rod and for bodily movement with said rod longitudinally of said spindle, a rotary cutter mounted on said cutter support for movement toward said spindle during pivoting of said cutter support and for movement along the length of a pear on said spindle as said rod moves along said longitudinal path, means for moving said rod along said fixed path, a stationary guide member on said platform having a contoured guide slot, and a follower member secured to said cutter support and disposed in said slot for effecting pivoting movement of said cutter support to swing said cutter through a fixed angular distance as said cutter traverses the butt end of the pear.

13. A pear peeling machine comprising a platform, a rotatable spindle on said platform adapted to support a pear for rotation about the stem-blossom axis of the pear with said axis having a fixed orientation relative to said platform, a rod mounted for sliding movement along a fixed straight line path in a direction longitudinally of said spindle, a cutter support pivotally mounted on said rod and for bodily movement therewith and having an end portion disposed close to the surface of a pear on said spindle, a rotary cutter mounted on said end portion and in position to move along the length of a pear on said spindle as said rod moves along said longitudinal path, means for moving said rod along said fixed path, a stationary guide member on said platform having a contoured surface in contact with said cutter support member for guiding said cutter through a fixed angular distance as said cutter traverses the butt end of the pear, and spring means connected to said cutter support member and arranged to hold said cutter in contact with the contoured surface of said guide member as said cutter traverses the surface of the pear.

14. Apparatus for peeling pears comprising a support structure, a spindle on said support structure adapted to support a pear for rotation about its stem-blossom axis, a support member mounted for movement on said support structure along a path parallel to said spindle, means providing a pivot bearing on said support member having an axis disposed in a radial plane through the axis of said spindle and in a transverse plane substantially normal to said spindle, a carrier having an elongate body and a pivot member journalled in said bearing and disposed in said radial and transverse planes, means connected with said carrier for pivoting said carrier through substantially 90° about said axis from a position in said radial plane to a position in said transverse plane, whereby said cutter support arm and the cutter thereon is moved from said radial plane to said transverse plane, a cutter arm secured to said carrier and disposed in the plane of said elongate body and movable as a unit therewith during pivoting of said carrier, a disc cutter disposed on the end of said support arm adjacent said spindle with the axis of said cutter intersecting said spindle at the start of a peeling cut, and means connected with said support member for moving said support member along said parallel path to carry said cutter longitudinally along the surface of a pear on said spindle, and means urging said cutter toward the pear.

15. Apparatus for peeling pears comprising a support structure, a spindle on said support structure adapted to support a pear for rotation about its stem-blossom axis, a support member, means mounting said support member for movement on said support structure along a path substantially parallel to said spindle, a carrier pivotally mounted on said support member, power driven control means connected with the carrier to pivot the same, a cutter arm pivotally mounted on said carrier and movable therewith during pivoting movement of said carrier, said arm having an end portion disposed adjacent said spindle and movable longitudinally of said spindle upon the pivoting of the carrier and angularly part way around said spindle incident to the pivoting of the carrier, a rotary cutter on said arm end portion, said arm having a length such that said cutter on said end portion may be positioned close to said spindle adjacent the blossom end of a pear on the spindle, said power driven control means moving said carrier to an initial cutting position in which the axis of said rotary cutter intersects the spindle, for pivoting said carrier whereby said cutter end portion and said cutter are moved longitudinally of said spindle to move said cutter around the butt end of the pear, movable means connected between said support member and said support structure for moving said support member along said substantially parallel path to carry said cutter longitudinally of said spindle, and means connected between said carrier and said cutter arm for pivoting said cutter arm on said carrier to urge said cutter into contact with a pear during movement of said cutter longitudinally of said spindle.

16. Apparatus for peeling pears comprising a support structure, a spindle on said support structure adapted to support a pear for rotation about its stem-blossom axis, a support member, means mounting said support member for movement on said support structure along a path substantially parallel to said spindle, a carrier pivotally mounted on said support member, power driven control means connected with the carrier to pivot the same, a cutter arm pivotally mounted on said carrier and movable therewith during pivoting movement of said carrier, said arm having an end portion disposed adjacent said spindle and movable longitudinally of said spindle upon the pivoting of the carrier and angularly part way around said spindle incident to the pivoting of said carrier, a rotary cutter on said arm end portion, said arm having a length such that said cutter on said end portion may be positioned close to said spindle adjacent the blossom end of a pear on the spindle, said power driven control means being arranged to move said carrier to an initial cutting position in which the axis of said rotary cutter is spaced from the axis of the spindle by a distance less than the sum of the radius of the spindle and the radius of the cutter whereby during subsequent pivoting of said carrier by said control means said cutter is moved longitudinally of said spindle to move said cutter around the butt end of the pear, movable means connected between said support member and said support structure for moving said support member along said substantially parallel path to carry said cutter longitudinally of said spindle, and means connected between said carrier and said cutter arm for pivoting said cutter arm on said carrier to urge said cutter into contact with a pear during movement of said cutter longitudinally of said spindle.

References Cited in the file of this patent

UNITED STATES PATENTS

| | | |
|---|---|---|
| 340,937 | Cottrell | Apr. 27, 1886 |
| 1,831,786 | Duncan | Nov. 10, 1931 |
| 1,872,731 | Goranson et al. | Aug. 23, 1932 |
| 2,740,441 | Coons | Apr. 3, 1956 |
| 2,860,676 | Coons et al. | Nov. 18, 1958 |